United States Patent [19]
Haka et al.

[11] Patent Number: 5,357,821
[45] Date of Patent: Oct. 25, 1994

[54] TRANSMISSION AND SHIFT CONTROL

[75] Inventors: Raymond J. Haka, Rochester; Joel M. Maguire, Dearborn; Dean E. McCulloch, Rochester Hills, all of Mich.

[73] Assignee: General Motors Corporation, Detroit, Mich.

[21] Appl. No.: 47,510

[22] Filed: Apr. 13, 1993

[51] Int. Cl.⁵ .............................................. F16H 59/00
[52] U.S. Cl. ...................................... 74/335; 74/337.5
[58] Field of Search ................................ 74/335, 337.5

[56] References Cited

U.S. PATENT DOCUMENTS

| | | | |
|---|---|---|---|
| 4,565,106 | 1/1986 | Sumiyoshi | 74/333 |
| 4,776,227 | 10/1988 | Janiszewski | 74/359 |
| 4,777,837 | 10/1988 | Lehle | 74/333 |
| 5,234,090 | 8/1993 | Haka | 192/70.25 |
| 5,239,880 | 8/1993 | Hawkins et al. | 74/406 |

*Primary Examiner*—John T. Kwon
*Attorney, Agent, or Firm*—Donald F. Scherer

[57] ABSTRACT

A countershaft transmission and control has an input shaft, two countershafts and an output differential. Each countershaft has a fluid operated clutch connected therewith to selectively connect the respective countershaft with the output differential through reduction gearing. A plurality of drive and driven gear members are connected in meshing relation between the input shaft and the countershafts. Individually operable synchronizers are disposed on the countershafts to selectively engage the driven gears with the countershaft to establish gear ratios between the input shaft and the output differential. The synchronizers are operated by a control mechanism comprised of drive keys for selectively connecting synchronizer forks with a longitudinally movable shaft member. The control mechanism is also operable to provide a positive displacement pump assembly operated by the shaft member to deliver pressurized fluid to the clutch member for enforcing engagement thereof.

3 Claims, 3 Drawing Sheets

TRANSMISSION AND SHIFT CONTROL

TECHNICAL FIELD

This invention relates to transmissions and shift controls. More particularly, this invention relates to synchronizer type countershaft transmissions and control mechanisms for engaging the synchronizers, and for controlling the engagement of fluid operated clutches.

BACKGROUND OF THE INVENTION

In countershaft type transmissions, it is well known to utilize mechanical, fluid operated, electrical and electro-mechanical shift controls. These control members generally establish the position of the shift forks which, in turn, control the engagement of synchronizer mechanisms for establishing the drive ratio within the transmission.

In some synchronizer transmissions, it is known to utilize fluid operated clutches in place of the synchronizer mechanisms to establish the drive connection between specific gears and their respective shafts. These control systems utilize a controlled clutch member, which is connected between the prime mover or engine and the transmission. The shift sequence can then be accomplished either manually or automatically as the vehicle is accelerated from a standing start. Generally, the operator will have a shift lever which permits selection of various drive ratios within the transmission, or provides for automatic sequencing of upshifting and downshifting as desired.

SUMMARY OF THE INVENTION

The present invention provides for gear selection in a dual countershaft type power transmission which utilizes synchronizer assemblies for establishing the drive ratio within the transmission and fluid operated clutches for providing a drive connection between the transmission and the output member thereof.

In the present invention, the synchronizers on each countershaft are manipulated by shift forks which are responsive to drive key members connecting the respective fork with a longitudinally movable shaft or rod member. The rod member first moves the desired shift fork to establish the drive connection through the respective synchronizer. The control mechanism then releases the drive key from the shift fork while retaining the shift fork in the desired position and continues linear movement to operate a positive displacement fluid pump which delivers fluid to the desired clutch. The clutches are operatively connected between each countershaft and an output differential through a final drive gearing mechanism.

The pump member is preferably a dual action piston pump having a large piston area chamber and a small piston area chamber. The small piston area chamber will establish the high engagement pressure at the clutch while the large piston area chamber will establish a low engagement pressure. The pump rod is driven linearly by a controlled motor and gear mechanism. The motor is preferably of the type which requires increased current to increase torque output of the motor. Thus, the linear force imposed on the piston rod is proportional to the current at the motor such that a signal is provided to the control mechanism to establish the pressure to be utilized at the clutch member.

It is an object of this invention to provide an improved control mechanism for a dual countershaft transmission having synchronizers for ratio selection and a fluid operated clutch on each countershaft for completing a drive connection between the countershaft and the transmission output.

It is another object of this invention to provide an improved dual countershaft transmission and control mechanism, wherein the control mechanism is operative to select the desired transmission ratio through actuation of synchronizers on the respective countershaft in the transmission and to control the pressurization of clutch means disposed on each countershaft within the transmission.

It is a further object of this invention to provide an improved dual countershaft transmission control, wherein a clutch on each countershaft is controlled by a pump which is effective to selectively provide a high engagement pressure and a low engagement pressure at the clutch depending upon the torque transmitting requirement at the clutch as determined by the on-coming gear ratio.

It is a still further object of this invention to provide an improved dual countershaft transmission control, wherein mechanical synchronizers and a fluid operated clutch on each countershaft are controlled by shift forks and a pump, all of which are actuated by a linearly movable rod member.

DESCRIPTION OF AN EXEMPLARY EMBODIMENT

Figure 1:
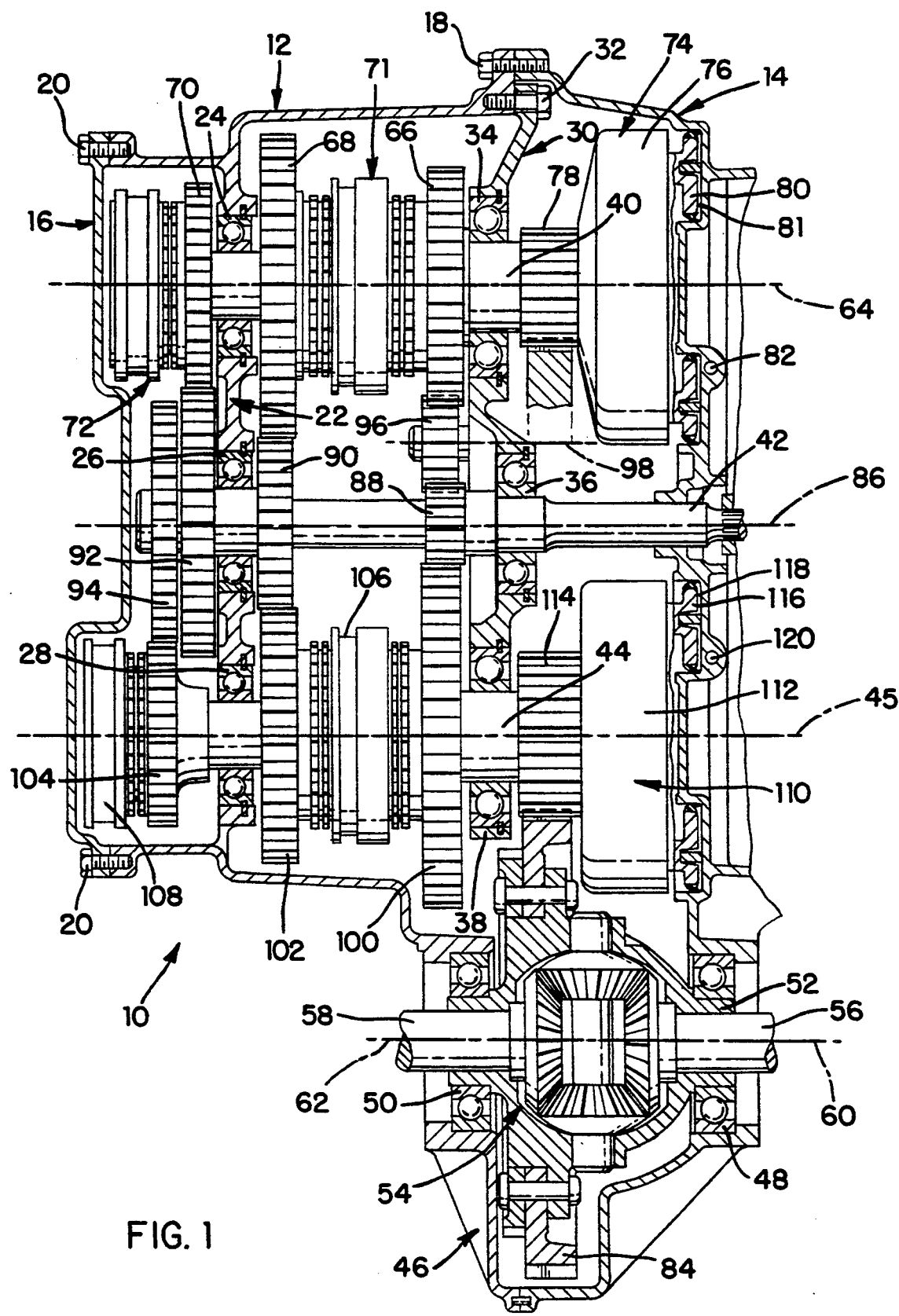
FIG. 1 is a cross-sectional elevational view of a transmission incorporating the present invention. This view is an unfolded view and taken along the line 1—1, as viewed in FIG. 4.

Referring to the drawings, wherein like characters represent the same or corresponding parts throughout the several views, there is seen in FIG. 1, a transmission assembly 10 having a main housing 12, a front housing 14 and an end cover 16. The main housing 12 and front housing 14 are secured together by a plurality of threaded fasteners 18 and the cover 16 of the main housing 12 are secured together by a plurality of threaded fasteners 20.

The main housing 12 has a support web portion 22 adjacent the cover 16. This support web 22 provides support for a plurality of conventional ball bearing members 24, 26 and 28. A front support web 30 is secured to the main housing 12 by a plurality of fasteners 32. The web 30 provides support for a plurality of ball bearings 34, 36 and 38. The ball bearings 24 and 34 support a countershaft 40; the ball bearings 26 and 36 support an input shaft 42; and the ball bearings 28 and 38 support a countershaft 44 on a countershaft axis 45.

The front housing 14 and main housing 12 cooperate to define a differential housing 46, which has mounted therein a pair of spaced conventional ball bearings 48 and 50, which rotatably support a carrier member 52 of a conventional differential gear assembly 54. The differential gear assembly 54 has a pair of output shafts 56 and 58, which are mounted to rotate on respective output axes 60 and 62. The output axes 60 and 62 are preferably aligned and coaxial.

The countershaft 40 is rotatably supported in the bearings 24 and 34 on a countershaft axis 64. The countershaft 40 has rotatably supported thereon a plurality of driven gears 66, 68 and 70. Also, supported and drivingly secured with the countershaft 40 are a pair of synchronizer assemblies 71 and 72. The synchronizer 71 is operable to selectively connect the driven gears 66 and 68 with the countershaft 40 while the synchronizer 72 is selectively operable to connect the gear 70 with the countershaft 40.

Also rotatably disposed on the countershaft 40 is a clutch assembly 74, which may be constructed in accordance with the clutch assembly described in U.S. Pat. No. 5,234,090, issued Aug. 10, 1993, in the name of Haka, and assigned to the assignee of this application.

The clutch assembly 74 has an output hub 76 to which is secured a final drive gear 78. The clutch assembly 74 also includes a piston member 80 which is slidably disposed in a chamber 81 formed in the front housing 14 and is operable by fluid pressure directed through a fluid passage or port 82 to cause the piston 80 to apply axial force to a plurality of conventional friction discs through an axial thrust bearing, not shown, which are alternately connected between the countershaft 40 and the output hub 76. When the clutch assembly 74 is engaged by fluid pressure admitted through passage 82, the clutch assembly 74 is effective to transmit power from the countershaft 40 through the final drive gear 78 to a final drive output gear 84, which is an input member for the differential assembly 54.

The input shaft 42 is rotatably disposed in the bearings 26 and 36 on an input axis 86. The input shaft 42 has rotatably secured therewith a plurality of driven gears 88, 90, 92 and 94. The gear 88 meshes with a reverse idler gear 96, which is rotatably supported on a reverse axis 98. The idler gear 96 also meshes with the driven gear 66, which is rotatably supported on the countershaft 40.

The gear 88 also meshes with a driven gear 100, which is rotatably supported on the countershaft 44. The gear 90 meshes with the driven gear 68, which is rotatably supported on the countershaft 40 and with a gear 102 rotatably supported on the countershaft 44. The gear 92 is disposed in meshing relationship with the gear 70, which is rotatably supported on the countershaft 40, and the gear 94 is disposed in meshing relationship with the gear 104 rotatably supported on the countershaft 44.

The countershaft 44 has drivingly connected therewith a pair of synchronizer assemblies 106 and 108, which are conventional in design. The synchronizer 106 is selectively operable to provide a drive connection between the countershaft 44 and the gears 100 and 102, while the synchronizer 108 is selectively operable to provide a drive connection between the gear 104 and the countershaft 44.

The countershaft 44 also has operatively connected therewith a clutch assembly 110. The clutch assembly 110 is constructed in accordance with the teaching of U.S. Pat. No. 5,234,090. The clutch assembly 110 includes an output hub 112 to which is secured a final drive gear 114, which in turn, is rotatably supported on the countershaft 44. The final drive gear 114 meshes with the gear 84 of the differential assembly 54.

The clutch assembly 110 also includes a fluid operated piston 116, which is slidably disposed in a chamber 118 formed in the front housing 14. The chamber 118 is connected to a fluid passage or port 120 through which fluid pressure is delivered to enforce operation or engagement of the clutch assembly 110. With the clutch assembly 110 engaged, the countershaft 44 is connected with the final drive gear 114.

The gears 88 and 100 cooperate to form the lowest gear ratio within the transmission 10. This gear ratio will establish the highest torque ratio between the prime mover, not shown, and the output shafts 56 and 58. The power path is established by engaging the synchronizer 106 with the gear 100 and engaging the clutch assembly 110.

The second forward ratio is established through the gears 90 and 68 by engagement of the synchronizer assembly 71 and the engagement of the clutch assembly 74. The first gear ratio provides the drive connection to the differential 54 through the final drive gears 114 and 84, while the second gear ratio establishes the final drive path through the final drive gear 78 and gear 84. The ratios established between the respective countershafts 40 and 44 and the differential 54, is determined by the size of the final drive gears 78 and 114.

In the particular assembly shown, the final drive gear 78 has been made smaller than the final drive gear 114, such that the torque ratio between countershaft 40 and the differential 54 will be greater than the torque ratio between the final drive gear 114 and the differential 54.

The third forward gear ratio is established within the transmission by engaging the synchronizer 106 with the gear 102 and engaging the clutch assembly 110. The fourth gear ratio is established by engaging the synchronizer 72 with the gear 70 and engaging the clutch assembly 74. The fifth and highest speed ratio is established by connecting the synchronizer 108 with the gear 104 and engaging the clutch assembly 110.

It should be appreciated at this point, that the dual countershaft transmission permits preselection of gear ratios on the countershaft which is not active. That is, when the transmission is operating in third gear, the gears on countershaft 40 can be conditioned for either second or fourth gear, depending upon whether an upshift or a downshift is being anticipated. This is possible since the output forces or torque from the respective countershafts does not interfere with the current driving ratio unless the fluid operated clutch assembly 74 or 110 is established.

Figure 2:
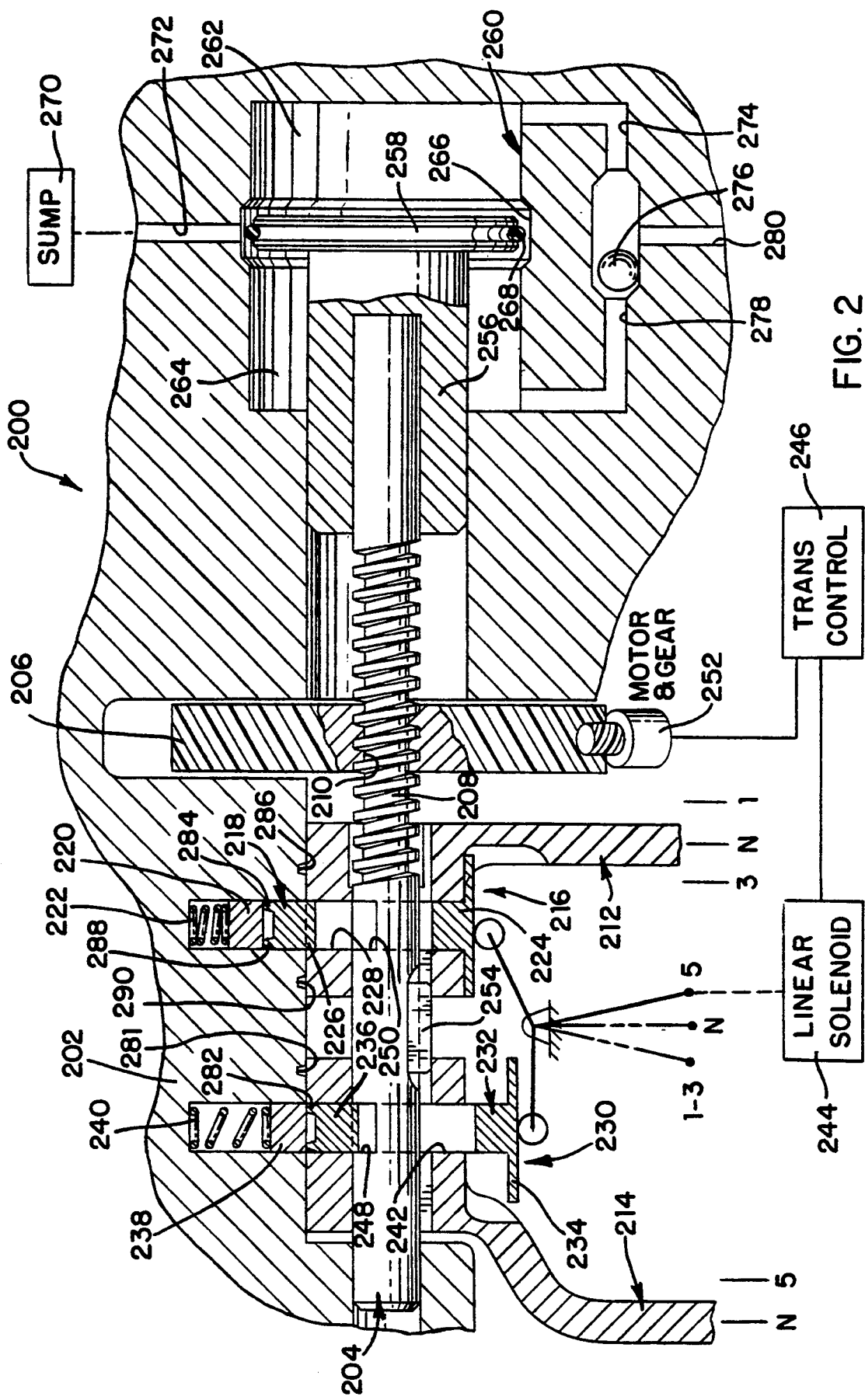
FIG. 2 is a diagrammatic representation of the shift forks, piston pump and operating mechanism for controlling the synchronizers and fluid clutch on one of the countershafts.

The diagrammatic representation of FIG. 2 depicts the control mechanism utilized for establishing the engagement and disengagement of the synchronizers 106 and 108, and likewise the engagement of the clutch assembly 110. An identical structure is provided for the control of the synchronizer assemblies 71 and 72 and clutch assembly 74 on the countershaft 40, therefore a description of the control mechanism in FIG. 2 should be considered as appropriate for a similar control mechanism to be utilized for the countershaft 40.

The control mechanism 200 is comprised of a housing 202 in which is slidably disposed a rod or shaft 204. The rod 204 rotatably supports a worm gear 206 which is prevented from axial movement by the housing 202. The worm gear 206 is supported on the rod 204 through a threaded connection comprised of a male thread 208 formed on the rod 204 and a female thread 210 formed on the gear 206. Rotation of the gear 206 will result in linear movement of the rod 204.

Also supported in the housing 202 is a pair of shift forks 212 and 214, which are operatively connected with the synchronizer assemblies 106 and 108, respectively. The shift fork 212 is selectively connectible to the housing 202 and the to shaft 204 by a drive key assembly 216. This drive key assembly 216 is comprised of a key 218, a bias plug 220 and a spring 222.

The key 218 has a hat portion 224 and a drive connecting portion 226. The hat portion 224 and drive portion 226 are both engaged in a slot 228 formed in the fork 212. The drive portion 226 also engages the housing 202, as shown in FIG. 2.

The shift fork 214 includes a drive key assembly 230 which is comprised of a key 232 having a hat portion 234, a drive portion 236, a bias plug 238 and a spring member 240. The key 232 is slidably disposed in a slot 242 formed in the fork 214. Both drive key assemblies 230 and 216 are moved to operable positions by a conventional linear solenoid 244, which responds to a conventional electronic transmission control 246. The solenoid 244 is operable to permit the drive key assembly 230 to be relieved of its linear restraint contact with the housing 202 to establish a drive connection with the rod 204 through a slot 248. Likewise, the solenoid 244 is operable to permit the drive key assembly 216 to engage a slot 250 formed in the shaft or rod 204.

The solenoid 244 is operable to prevent simultaneous connection between the shaft 204 and the drive key assemblies 216 and 230. Thus, only one shift fork 212 or 214 can be moved linearly by the shaft 204 at any given time. In the alternative, both drive key assemblies 216 and 230 can be moved to a neutral position such that the shaft 204 is freely movable linearly without moving either shift fork 212 or 214.

As previously mentioned, the linear solenoid 244 is controlled by a conventional transmission control 246, which preferably utilizes a digital type computer to establish the desired gear ratio in reliance upon operating parameters received from the vehicle, the engine and the driver. The transmission control 246 is also operable to provide control current to an electric motor and gear 252, which is operable to drive the worm gear 206.

The motor 252 is preferably of the type which requires increasing current to establish increasing torque output. Thus, the linear force on the shaft 204 can be determined by the transmission control 246 through the amount of current required to drive the shaft 204 linearly.

The shaft 204 is connected through a key 254 with the two shift forks 212 and 214, thus establishing a linear relationship between these members and preventing the shaft 204 from rotating with the worm gear 206. The shaft 204 is also drivingly connected to a piston rod 256, which has formed thereon a piston 258. The piston 258 is disposed in a bore 260, which has formed therein a pair of pressure chambers 262 and 264 and an enlarged bore portion 266.

The piston 258 has a seal 268 secured thereon which cooperates with the pressure chambers 262 and 264 to provide a fluid type connection, thus preventing flow of fluid pressure from the chambers 262 or 264 to the enlarged bore 266. The enlarged bore 266 is connected to a conventional sump 270, which provides continuous fluid connection to a passage 272 with the enlarged bore 266. Thus, the chambers 262 and 264 are also maintained full of fluid when the piston 258 is in the neutral position shown.

The chamber 262 has an outlet passage 274, which is in fluid communication with a conventional shuttle valve 276. The shuttle valve 276 is also in fluid connection with a passage 278 connected with the chamber 264 and with a clutch control passage 280. Clutch control passage 280 is connected with the port 120 of the clutch assembly 110. A similar assembly for establishing the engagement and disengagement of clutch assembly 74 as a fluid connection with the port 82.

Figure 3:
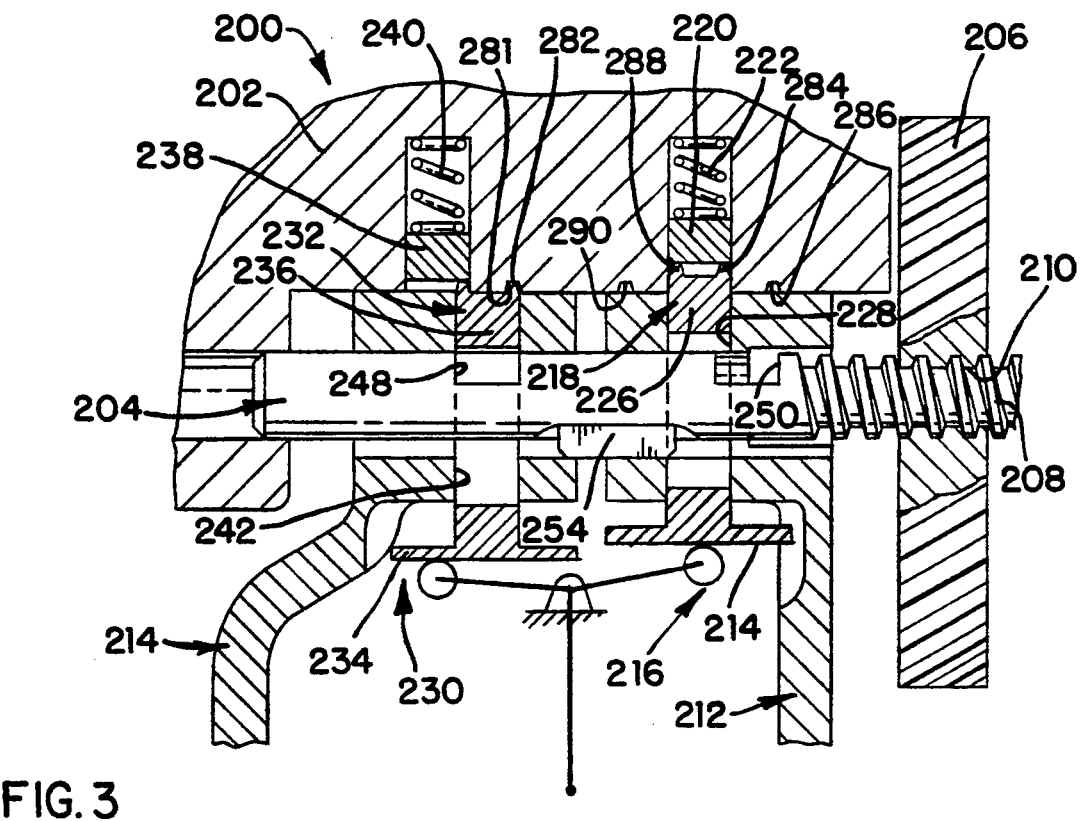
FIG. 3 is a view similar to FIG. 2 showing the shift forks moved to provide fifth gear within the transmission.
Figure 4:
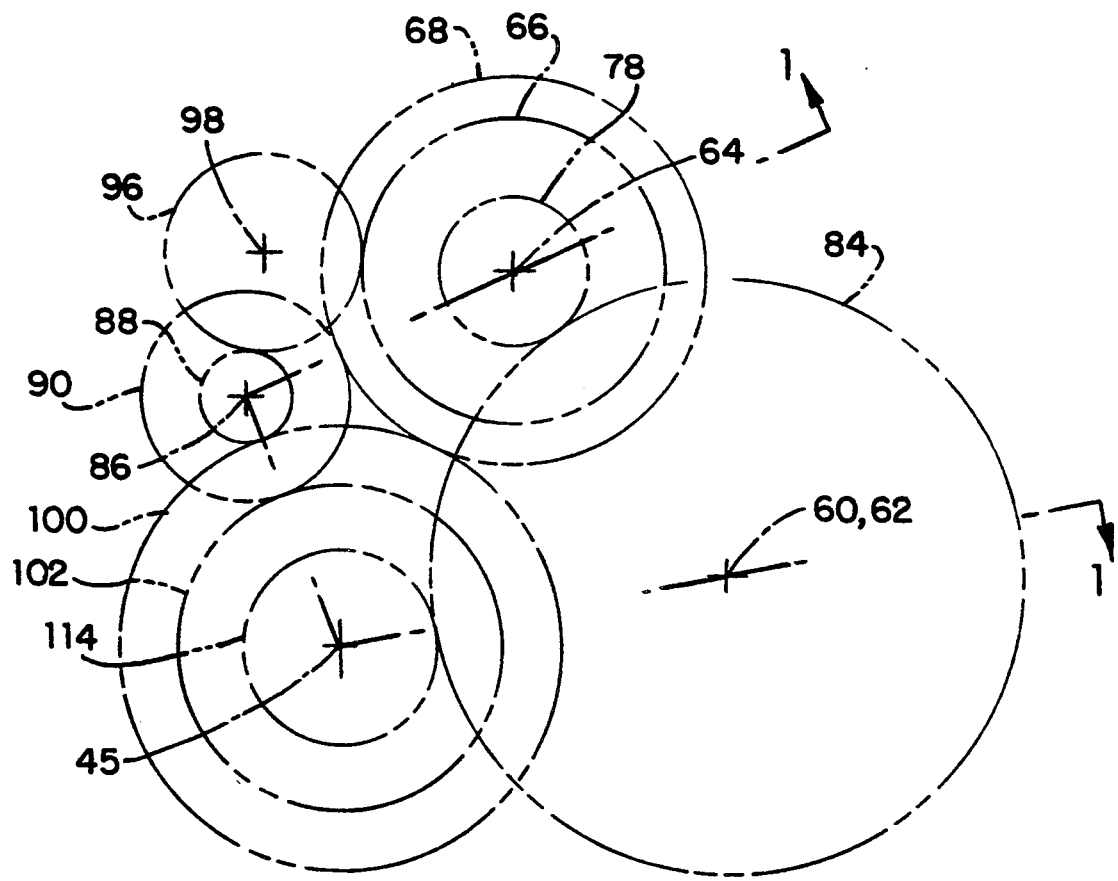
FIG. 4 is an end view showing the relationship of the shafts within the transmission.

As seen in FIG. 3, the control mechanism 200 has been operated to move the shift fork 214 from the neutral position shown in FIG. 2, to the fifth gear position shown in FIG. 3. In this position, the shift fork 214 has been moved rightward to control the engagement of the synchronizer 108 such that the gear 104 is drivingly connected to the countershaft 44.

When the control 200 establishes the synchronizer 108 in the engaged position, the solenoid 244 is operable to force the drive key assembly 230 toward the neutral position. However, in the fifth ratio position shown, the drive portion 236 is unable to move into the housing 202, and instead is held in a positioning recess 281 through an ear 282. However, in this position, the drive key assembly 230 is freed from the rod 204. Also, in the position shown in FIG. 3, the drive key assembly 218 is also freed from the rod 204. Thus, the rod 204 is free to move linearly relative to the shift forks 212 and 214. It is the further linear movement from this position which will enforce the engagement of the clutch assembly 110.

If the piston 258 continues to move rightward from this position, the fluid in chamber 262 will be forced into the clutch assembly 110, thereby causing engagement of the clutch. Since the pressure within the chamber 262 will be proportional to the linear force of the piston 258, the control motor 252 will need increasing current to establish the pressure in the chamber 262. If a limiting current is utilized to establish maximum pressure, the pressure in chamber 262 will be limited thereby. It is also possible to have the control 246 determine the desired pressure and limit the current accordingly.

It should be appreciated that with the same linear force imposed on the piston 258, the chamber 264 can create a higher pressure than the chamber 262. Thus, leftward movement of the piston 258 will result in the displacement of fluid in the chamber 264 to create a high pressure engagement for the clutch assembly 110, while rightward movement will create a low pressure engagement for the clutch 110.

The use of high and low pressure engagement forces at the clutch 110 is desirable to better match the torque requirement at the clutch as imposed by the particular gear ratio which is to be enforced. With the assembly shown, the torque transmitting requirement of the first gear ratio and the third gear ratio are substantially identical, while the torque transmitting requirement of the fifth gear ratio is significantly less. Thus, the piston 258 will be moved rightward to establish engagement during the fifth gear ratio and will be leftward to establish clutch engagement during the first and third ratio.

The control assembly for the countershaft 40 will have a similar pressure relationship with the desired ratios, such that the second gear ratio and the reverse gear ratio will utilize the high pressure portion of the pump and the fourth gear ratio will utilize the low pressure portion of the pump.

The first gear ratio torque requirement is high due to the starting requirement of the vehicle and the high torque ratio that is imposed through the gears 88 and 100. The third gear ratio has a lower torque ratio between the gears 90 and 102, but must absorb the engine inertia torque during an upshift, and therefore has a torque requirement level substantially equal to the torque requirement level of the first gear ratio.

The fifth ratio has a significantly lower torque ratio, such that the torque ratio in engine inertia requirement during an upshift from fourth to fifth is not high enough to require the high pressure which can be generated by the pressure chamber 264 when the pump is moved leftward. Thus, the control function is established to provide the proper movement of the piston 258 during a ratio interchange.

When it is desired to operate in first gear, it should be appreciated that the shift fork 212 will be rightward to establish the proper gear engagement on the countershaft 44. When the proper position is attained, the portion 226 has an ear 284 which will engage an opening 286 in the housing 202. When this is accomplished, the shaft 204 will be free to move linearly without further movement of the shift forks 212 and 214, such that the piston can be moved leftward following the initial rightward movement of the shaft 204. The enlarged bore 266 has sufficient axial length to permit the shift forks 212 and 214 to be moved to their desired ratio positions prior to either chamber 262 or 264 being engaged by the piston 258.

To establish the third gear ratio in the transmission, the shift fork 212 is moved leftward such that an ear 288 formed on the portion 226 will engage an opening 290 formed in the housing 202. Thus, the shift forks 214 and 212 are held in their respective shifted position by the drive connecting portions 226 and 236. And the position of the fork will depend upon whether the drive key is engaged in one of the respective notches or within the housing proper.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A countershaft transmission and control comprising:
   an input means;
   an output means;
   selectively engageable clutch means for drivingly connecting the input means with the output means, said clutch means including a housing defining a chamber and a clutch piston slidably disposed in the chamber;
   a plurality of gear ratio means disposed between the input means and the output means including a plurality of synchronizer means for selectively individually engaging said gear ratio means to establish selected ratios between the input and output means; and
   control means for controlling the synchronizer means including an axially movable shaft, means for selectively moving said shaft, a plurality of fork means for individually selectively connecting said synchronizer means to said shaft, means for selectively connecting said fork means with said shaft to individually enforce linear movement of said fork means with the axial movement of said shaft to effect establishment of selected gear ratios, and piston means movable with said shaft for establishing a fluid pressure level in said chamber to establish the engaged condition of said clutch means.

2. A countershaft transmission and control comprising:
   an input means;
   an output means;
   selectively engageable clutch means for drivingly connecting the input means with the output means, said clutch means including a housing defining a chamber and a clutch piston slidably disposed in the chamber;
   a plurality of gear ratio means disposed between the input means and the output means including a plurality of synchronizer means for selectively individually engaging said gear ratio means to establish selected ratios between the input and output means; and
   control means for controlling the synchronizer means including shaft means providing a linearly movable shaft, means for selectively moving said shaft means a predetermined linear distance, a plurality of fork means for individually selectively connecting said synchronizer means to said shaft means, means for selectively connecting said fork means with said shaft means to individually enforce linear movement of said fork means with the axial movement of said shaft means during a first portion of said predetermined linear distance to effect establishment of selected gear ratios, and pump means movable with said shaft means during all of said predetermined linear distance for establishing a fluid pressure level in said chamber during a second portion of said predetermined linear distance to establish the engaged condition of said clutch means.

3. A countershaft transmission and control comprising:
   an input means;
   an output means;
   a pair of spaced countershaft means;
   a plurality of selectively engageable clutch means for drivingly connecting respective countershaft means with the output means, each said clutch means including a housing defining a chamber and a clutch piston slidably disposed in the chamber;
   a plurality of gear ratio means disposed between the input means and respective countershaft means including a plurality of synchronizer means disposed on each countershaft means for selectively individually engaging said gear ratio means to establish selected ratios between the input and countershaft means; and
   control means for each countershaft means for controlling the synchronizer means, each control means including shaft means providing an axially movable shaft, means for selectively moving said shaft means, a plurality of fork means for individually selectively connecting said synchronizer means to said shaft means, means for selectively connecting said fork means with said shaft means to individually enforce linear movement of said fork means with the axial movement of said shaft means to effect establishment of selected gear ratios, and pump means having piston means movable with said shaft means for engaging in a pump chamber means for establishing a fluid pressure level in said chamber to establish the engaged condition of said clutch means subsequent to said synchronizer means establishing a gear ratio.

* * * * *